United States Patent
Andreas

[19]
[11] Patent Number: 6,166,628
[45] Date of Patent: *Dec. 26, 2000

[54] ARRANGEMENT AND METHOD FOR DETECTING OBJECTS FROM A MOTOR VEHICLE

[75] Inventor: Peter Andreas, Gifhorn, Germany

[73] Assignee: Volkswagen AG, Wolfsburg, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/969,225

[22] Filed: Nov. 13, 1997

[30] Foreign Application Priority Data

Nov. 20, 1996 [DE] Germany .............................. 196 47 951

[51] Int. Cl.$^7$ ...................................................... G08G 1/16
[52] U.S. Cl. ............................ 340/436; 340/435; 340/943; 340/942; 701/96; 701/223; 701/301; 180/169
[58] Field of Search ..................................... 340/435, 436, 340/437, 933, 942, 943; 701/96, 223, 301; 180/169

[56] References Cited

U.S. PATENT DOCUMENTS

| | | | |
|---|---|---|---|
| 5,465,089 | 11/1995 | Nakatani et al. | 340/995 |
| 5,467,284 | 11/1995 | Yoshioka et al. | 340/903 |
| 5,510,990 | 4/1996 | Hibino et al. | 340/436 |
| 5,530,651 | 6/1996 | Uemura et al. | 340/435 |
| 5,661,650 | 8/1997 | Sekine et al. | 340/438 |
| 5,798,727 | 8/1998 | Shirai et al. | 340/436 |

FOREIGN PATENT DOCUMENTS

| | | |
|---|---|---|
| 3616930 | 6/1989 | Germany . |
| 4418122 | 12/1994 | Germany . |
| 19506364 | 7/1997 | Germany . |
| 2279841 | 1/1995 | United Kingdom . |

*Primary Examiner*—Daniel J. Wu
*Attorney, Agent, or Firm*—Baker Botts L.L.P.

[57] ABSTRACT

A motor vehicle object-detecting arrangement includes a distance controller having a distance-sensing device for emitting and receiving object-reflected measuring beams in different directions and having an evaluation unit. The measuring beams received by the distance-sensing device are appraised as a function of the geometry of the road on which the vehicle is being driven. For this purpose an appraisal device receives information from the distance sensing device and from a transmitter unit which supplies information on the road geometry of the road. The appraisal device appraises the measuring beams reflected from different directions as a function of the information on the road geometry.

10 Claims, 2 Drawing Sheets

ARRANGEMENT AND METHOD FOR DETECTING OBJECTS FROM A MOTOR VEHICLE

BACKGROUND OF INVENTION

This invention relates to arrangements and methods for detecting objects from a motor vehicle.

There are many conventional arrangements for detecting objects which are located in the driving direction and in the driving area of a motor vehicle. In such arrangements the object distance and the angle to the object with respect to a central axis are determined.

British published application No. 2 279 841 discloses an object-detecting arrangement as a component of a speed control device. In this arrangement account is taken of driving on curves and, by automatic tracking and assessment of detected objects, dangerous objects are distinguished from harmless objects. For example, dangerous, rigid motionless barriers in the driving direction are distinguished from harmless vehicles driving ahead.

German Offenlegungsschrifft No. 43 41 689 discloses an anticollision radar system for motor vehicles which uses a distance sensor to determine an object distance as well as road curvature. This arrangement also uses a probability-determining device to identify vehicles driving ahead as distinct from fixed objects. Complicated measures are used especially when driving on curves, to determine probability distributions for detected conditions which are angularly displaced with respect to a central zone.

Another conventional obstacle-detecting arrangement for motor vehicles, disclosed in German Offenlegungsschrifft No. 44 18 122, involves similar considerations and takes account, for the straight-ahead direction of a motor vehicle, of main paths and substitute paths, laterally adjoining the main path, to appraise obstacles.

Furthermore, such an object-detecting arrangement is disclosed in German Patent No. 36 16 930 as a component of a distance controller which is used for automatic control of the distance from a vehicle driving ahead, in particular for convoy driving. In this case, a change in detected measuring beams is evaluated for the purpose of object detection and object appraisal.

In addition, a vehicle control system for controlling a vehicle with reference to a shape of a road is disclosed in German Offenlegungsschrifft No. 195 06 364. In that system, information relating to the road geometry is made available from a navigation device which provides map information from a plurality of coordinate points mapping the road.

In general, such conventional object-detecting arrangements include at least one distance sensor mounted on the vehicle, for example a radar or laser device, for emitting beams in different directions with respect to a central beam aligned in the longitudinal direction of the vehicle, as well as for receiving object-reflected measuring beams in a directionally selective fashion. The received measuring beams and their propagation delay are analyzed in an electronic evaluation system, and the object distance and the object angle, that is to say the position of an object relative to the vehicle, are determined therefrom.

Warning strategies for critical approaches for a vehicle to other objects and, in particular, for semi-automatic driving in conjunction with a distance controller, are only acceptable when the systems employed function at their best and are highly reliable and have only a low number of erroneous reports or faulty interventions.

In addition to precise object detection, an essential factor for effective functioning of such systems is an appraisal as to whether a critical, possibly dangerous object or a non-critical object is involved. In this case, objects outside a driving lane are to be appraised as non-critical in most cases.

SUMMARY OF THE INVENTION

Accordingly, it is an object of the present invention to provide an arrangement and method for detecting objects from a motor vehicle which overcomes the disadvantages of the prior art.

Another object of the invention is to provide an object-detecting arrangement and method for detecting objects that can be used utilizing conventional devices to provide appraisal of detected objects for consideration in a simple and effective manner.

These and other objects of the invention are attained by appraising the reflective measuring beams received by a distance-sensing device as a function of the geometry of the road on which the motor vehicle is being driven. For this purpose, a distance-sensing device supplies an output to an appraisal device which also receives information from a transmitting unit relating to the geometry of the road on which the vehicle is being driven. The appraisal device appraises the direction of the reflected measuring beams with reference to the position of the motor vehicle as a function of the road geometry.

Consequently, at an early stage during the processing of the reflected measuring-beam data, detected objects are appraised as to whether, for example, they are critical or non-critical in conjunction with a warning device or a distance controller. Since this appraisal is performed by a simple analysis of the reflected measuring beams, the overall design of the object-detecting device is simple, functional and cost effective. Non-critical objects can be ignored from the very beginning because of the utilization of information relating to the road geometry.

Information relating to a current curve in the road can be obtained in a conventional manner using a dedicated unit in the vehicle which responds to steering-angle sensors and/or wheel speed sensors. A substantial increase in the road geometry information can be provided by including stored road maps in a navigation unit. Stored data for the current road width and current lane width is also available in addition to stored data for a current curve in the road.

A substantial improvement in the quality of the appraisal of critical and non-critical objects is achieved when the reflected measuring beams are appraised as relevant or irrelevant for the distance controller as a function both of direction and of propagation delay in accordance with a specific distance of the reflecting object.

By utilizing the object-detecting arrangement described above and the object appraisal carried out thereby, malfunctions and erroneous reports from a distance controller and/or of a distance-warning device are reduced, and thus their reliability and acceptability are increased.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
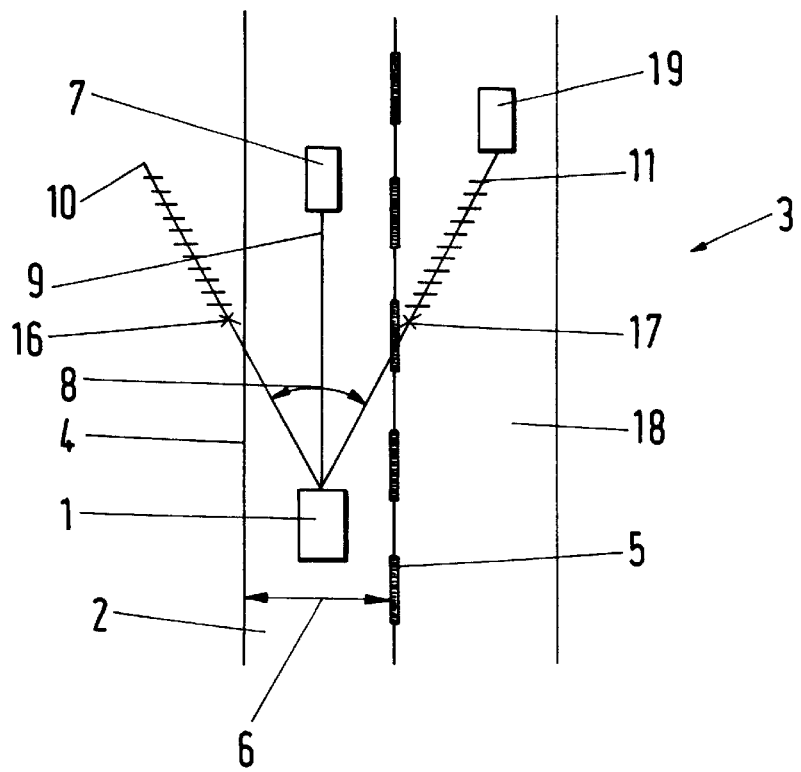
FIG. 1 is a diagrammatic plan view showing a straight road with a motor vehicle.
Figure 2:
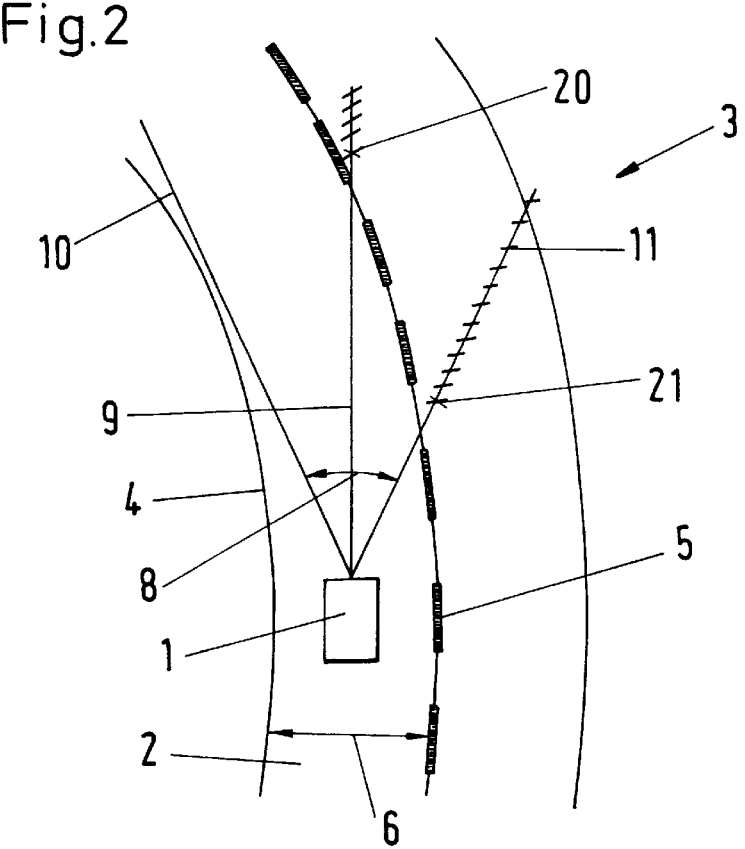
FIG. 2 is a plan view showing a motor vehicle utilizing a representative embodiment of the invention for detecting objects from the vehicle on a road with a slight curve.
Figure 3:
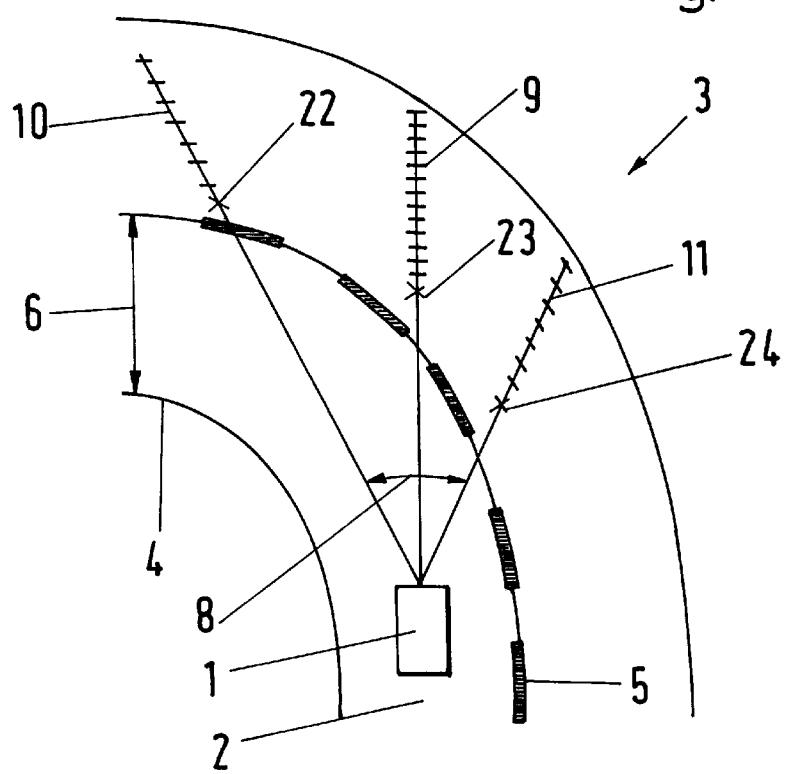
FIG. 3 is plan view of a motor vehicle utilizing a representative embodiment of the invention on a road with a tight curve.

In the diagrammatical plan views shown in FIGS. 1, 2 and 3, a vehicle 1 is illustrated driving on the left-hand lane 2 of a road 3. The lane 2 is limited laterally by a left-hand road edge 4 and a right-hand median strip 5 which establish a lane width 6.

The vehicle 1 includes a distance control system 12, by which a predetermined distance from a vehicle 7 driving ahead is maintained, as shown in FIG. 1. The distance controller 12 includes an object-detecting arrangement with a distance sensor by which measuring beams, for example radar beams, are emitted in a cone 8, and object-reflected measuring beams are detected accordingly. The propagation delay and direction of the received measuring beams correspond to the distance and direction of an object in front of the vehicle, for example the vehicle 7 driving ahead.

In the measuring beams shown in FIGS. 1–3, a center beam 9 corresponding to a system center beam is projected in the longitudinal direction of the vehicle and a left-hand measuring beam 10 and right-hand measuring beam 11 are projected at corresponding angles from the center beam 9.

The operation of the object-detecting arrangement is described hereinafter with reference to the block diagram of a distance controller 12 in FIG. 4.

In the distance controller 12 a distance sensor 13 supplies signals to an appraisal device 14 which also receives information relating to the road geometry in accordance with the current road width, current lane width and current road curvature of the road been driven on from a transmitting unit 15. Consequently, the appraisal arrangement obtains the information that there is a specific lane width 6 and that the next road section to be driven on extends straight ahead for the condition shown in FIG. 1. For the condition shown in FIG. 2, the appraisal arrangement receives the same information regarding the lane width 6 and also that the road section lying ahead has a slight curve to the left while, for the condition shown in FIG. 3, a road section lying ahead had a strong curve to the left. The transmitting unit 15 preferably contains a stored road map of a navigation system which is supplemented by vehicle-specific measurement information, for example, information relating to the steering angle and differences in speed of the wheels.

In the appraisal arrangement 14, the reflected measuring beams are analyzed as a function of the current curvature of the road and the lane width 6 to determine whether, on the basis of their determined direction and propagation delay, they have been reflected and received from regions outside the driving lane 2.

Thus, in the condition shown in FIG. 1 the left-hand and right - hand measuring beams 10 and 11 are reflected from regions further removed than the points 16 and 17, for example, a vehicle 19 driving ahead on the neighboring lane 18, providing object information which is ignored in the analyses made by the distance controller 12.

In a corresponding way, for the condition shown in FIG. 2, data from the central beam 9 and the right-hand measuring beam 11, which correspond to objects at a greater distance than the points 20 and 21, respectively, are ignored in the analysis. In this case, only the object that reflects the measuring beam 10 is taken into account for distance measurement since the measuring beam 10 does not leave the lane 2 over a wide region.

In the condition shown in FIG. 3, regions and data from objects which lie beyond the points 22, 23, 24 are rejected. A corresponding procedure is adopted for other reflected measuring beams within the cone 8, with the result that objects outside the driving lane 2 are ignored in the distance controller.

Figure 4:
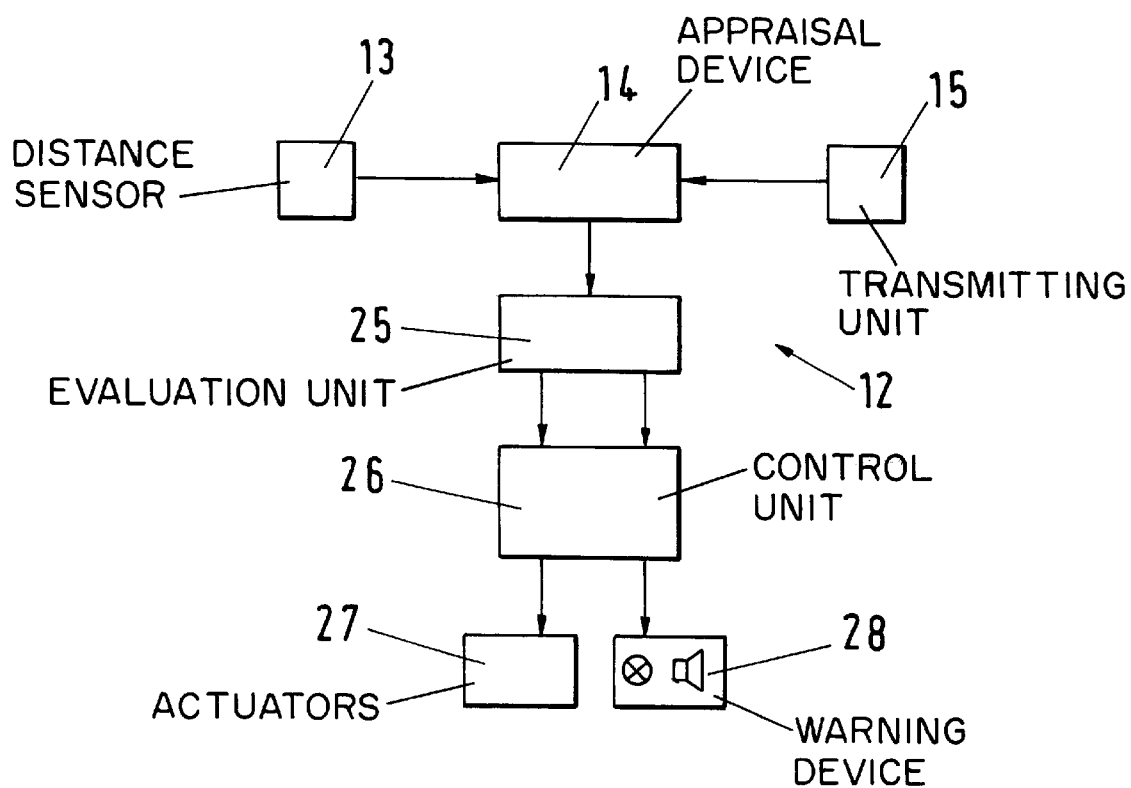
FIG. 4 is a schematic block diagram showing a typical embodiment of a distance control arrangement for detecting objects in accordance with the invention.

In the arrangement shown schematically FIG. 4, the reflected measuring beam data are supplied to an evaluation unit 25 which, for example, conducts an object tracking analysis and distinguishes vehicles driving ahead from motionless obstacles and transmits correspondingly appraised distance data and angle data to a control unit 26. The control unit 26, in turn, supplies control signals to actuators 27 for accelerating or braking the vehicle, and to an acoustic and optical warning device 28.

Although the invention has been described herein with reference to a specific embodiment, many modifications and variations therein will readily occur to those skilled in the art. Accordingly, all such variations and modifications are included within the intended scope of the invention.

I claim:

1. A motor vehicle object-detecting arrangement comprising:

at least one distance-sensing device for emitting radiation beams in different directions with respect to a central axis and for receiving object-reflected measuring beams;

an evaluation system for determining object direction and object distance from the received measuring beams;

a transmitter for providing information relating to the geometry of the road on which the vehicle is being driven; and an appraisal arrangement which receives information from the evaluation system and from the transmitter and appraises the information from the evaluation system as a function of the road geometry, wherein information relating to detected objects is stored in the evaluation system resulting from appraisal of measuring beams reflected from the objects.

2. A method for detecting objects from a motor vehicle comprising:

emitting measuring beams from a distance-sensing device in different directions with regard to a central beam;

receiving measuring beams reflected from detected objects;

evaluating the received measuring beams to determined an object direction and an object distance; and appraising the reflected measuring beams received by the distance-sensing device as a function of the geometry of the road on which the vehicle is being driven, wherein information relating to the appraisal of reflected measuring beams from detected objects is stored in an evaluation device.

3. A method for detecting objects from a motor vehicle comprising:

emitting a plurality of measuring beams from a distance-sensing device in different fixed directions with regard to a central beam;

receiving a plurality of corresponding measuring beams reflected from detected objects;

evaluating the received measuring beams to determine an object direction and an object distance; and appraising the reflected measuring beams received by the distance-sensing device as a function of stored information relating to the geometry of the road on which the vehicle is being driven including at least one of a road curvature, a road width and a lane width and rejecting information received from regions outside the geometry of the road.

4. A method according to claim 3 wherein the appraisal of the reflected measuring beams is carried out in accordance with a specific distance of an object from which a beam is reflected.

5. A method according to claim 3 wherein information relating to appraisal of measuring beams reflected from an object is taken into account or ignored in at least one of a distance controller and a distance-warning device.

6. A motor vehicle object-detecting arrangement comprising:

at least one distance-sensing device for emitting a plurality of radiation beams in different fixed directions with respect to a central axis and for receiving a plurality of corresponding object-reflected measuring beams;

an evaluation system for determining object direction and object distance from the received measuring beams;

a transmitter for providing stored information relating to the geometry of the road on which the vehicle is being driven including at least one of a road curvature, a road width and a lane width; and an appraisal arrangement which receives information from the evaluation system and from the transmitter and appraises the information from the evaluation system as a function of the road geometry and rejects information received from regions outside the geometry of the road.

7. A motor vehicle object-detecting arrangement according to claim 1 wherein the appraisal of the object-reflected measuring beams in the appraisal device is carried out in accordance with a specific distance to the object from which the beam is reflected.

8. A motor vehicle object-detecting arrangement according to claim 1 wherein the transmitter provides road geometry information based on at least one steering angle sensor, or at least one wheel speed sensor, or corresponding road information from a stored road map.

9. A motor vehicle object-detecting arrangement according to claim 1 including at least one of a distance controller and a distance-warning device.

10. A motor vehicle object-detecting arrangement according to claim 9 wherein at least one of the distance controller and the distance-warning device takes account of or ignores detected objects as a function of information provided by reflected measuring beams.

* * * * *